No. 836,271.
PATENTED NOV. 20, 1906.
J. H. McCORMICK.
BRAKE MECHANISM.
APPLICATION FILED JUNE 4, 1906.
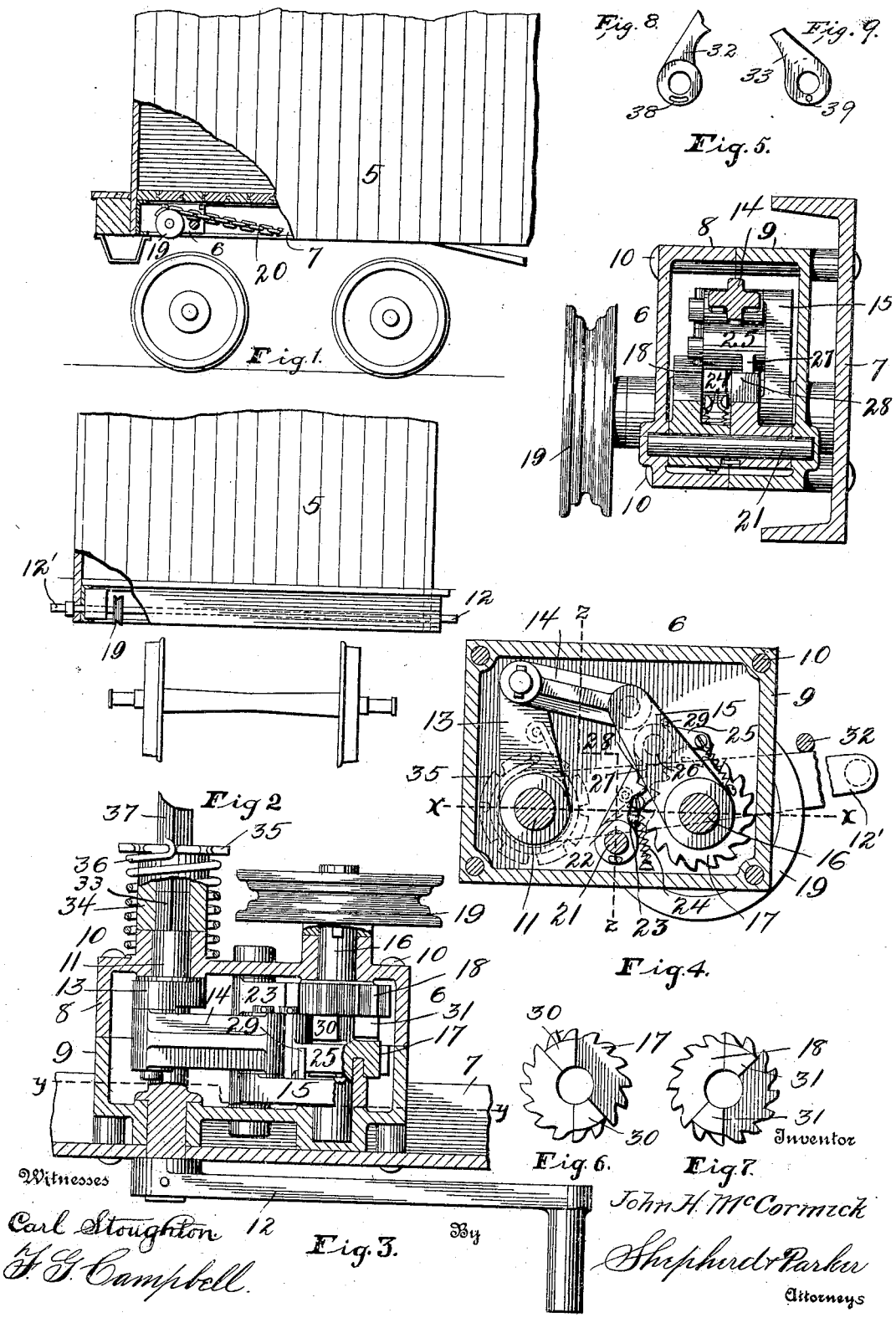

UNITED STATES PATENT OFFICE.

JOHN H. McCORMICK, OF COLUMBUS, OHIO.

BRAKE MECHANISM.

No. 836,271.

Specification of Letters Patent.

Patented Nov. 20, 1906.

Application filed June 4, 1906. Serial No. 320,041.

*To all whom it may concern:*

Be it known that I, JOHN H. McCORMICK, a citizen of the United States, residing at Columbus, in the county of Franklin and State of Ohio, have invented certain new and useful Improvements in Brake Mechanism, of which the following is a specification.

My invention relates to a brake mechanism for heavy vehicles, such as railway-cars, and has for its object the provision of a device of this character constructed in such manner that the brakes may be applied by a person standing upon the ground opposite the cars.
A further object of the invention is the provision of a brake mechanism constructed in such manner that the brakes may be applied by foot-power and also constructed in such manner that said brakes may be applied from various points upon the ground.

A further object of the invention is the provision of a brake mechanism which may be readily applied to the cars already in use and which will act in connection with the systems now used upon said cars.

A further object of the invention is the provision of a brake mechanism having means for automatically taking up the slack in the chain caused by the wear of the brake-shoes and the lengthening of the chains which apply the brakes, by virtue of which construction but a limited movement of the brake mechanism is required to set the brakes, said movement being the same in every instance, whether the car be a new one or an old one, in which the brake parts are considerably worn.

A further object of the invention is the provision of a brake mechanism comprising members connected by a link in such manner that upon the initial movement of said members a direct action is given thereto; but as the parts approach their limit of movement said link assumes such a position as to act as a toggle, thereby rendering it possible to secure great power in applying the brakes.

A further object of the invention is the provision of means for readily releasing the brake mechanism and also for releasing the slack which has been taken up when it is desired to substitute new brake-shoes for the old ones.

Further objects and advantages of the invention will be set forth in the detailed description which now follows.
In the accompanying drawings, Figure 1 is a partial side elevation of a car, illustrating one method of mounting my improved brake mechanism. Fig. 2 is a partial front elevation of said car. Fig. 3 is a horizontal section upon line x x of Fig. 4 with certain of the tion upon line *x x* of Fig. 4 with certain of the parts shown in elevation. Fig. 4 is a vertical section upon line *y y* of Fig. 3. Fig. 5 is a transverse vertical section upon line *z z* of Fig. 4. Figs. 6 and 7 are detail views of the fast and loose ratchet-wheels hereinafter described, and Figs. 8 and 9 are detail views of pawls hereinafter described.

In the present instance a brake mechanism comprising my invention is shown mounted upon an ordinary steel box-car 5. A casing 6, which contains mechanism hereinafter described, is secured to the channel-iron 7, which forms one of the side beams of the frame of the car immediately beneath the floor of the car. By referring to Figs. 3 and 5 it will be seen that this casing is made in two parts 8 and 9, which are riveted together, as at 10. A power-transmitting shaft 11 is journaled in the walls of this casing and has secured thereto upon the exterior of the car-frame an actuating-handle 12.

A crank-arm 13 is secured to the shaft 11, the free end of said crank-arm being connected by a link 14 with a second crank-arm 15. This second crank-arm 15 is loosely mounted upon a transversely-disposed shaft 16. A ratchet-wheel 17 is integrally formed with the shaft 16, while a second ratchet-wheel 18 is loosely mounted upon said shaft. A pulley 19 is secured to the shaft 16 upon the exterior of the casing and has secured thereto one end of a chain 20.

Loosely mounted upon a transversely-disposed shaft 21 are pawls 22 and 23, which are adapted to engage the ratchet-wheels 17 and 18, respectively. Springs 24 normally hold these pawls in engagement with their respective ratchet-wheels. A pawl 25 is pivotally mounted, as at 26, upon the crank-arm 15 and engages the fast ratchet-wheel 17. A tail 27, which is carried by the pawl 25, is adapted to engage a lug 28, which is carried by the pawl 22, as will be hereinafter set forth. A pin 29 limits the upward movement of the pawl 25. Lugs 30 and 31 are carried by the fast and loose ratchets, respectively, said lugs permitting a limited movement of the ratchet-wheels with relation to each other, it being understood that said lugs project toward each other and lie in the path of movement of each other. A stop-pin 32 limits the upward movement of the actuating-handle 12. The end 33 of the shaft 11 is reduced for the reception of a sleeve 34. This sleeve bears at its outer end a notched flange 35. One end of a coiled spring 36 engages this notched flange, and the other end of said spring is secured to the casing 6. An angular shaft 37 projects into this casing and turns therewith, the reduced end 33 of the shaft 11 being also angular in cross-section. By virtue of this construction the shaft 37, which is best illustrated in Fig. 2, is caused to turn with the shaft 11. This shaft 37 extends across the car and has an actuating-handle 12' secured thereto upon the opposite side of the car, by virtue of which construction it is possible to actuate the brake mechanism from either side of the car and from the ground. It will of course be understood that the opposite end of the car may be equipped in like manner.

The operation of the device is as follows: A car having been equipped with a mechanism of this character, the actuating-handle is forced downwardly. This imparts movement to the shaft 11 and through the arm 15 and pawl 25 to the fast ratchet-wheel 17. Since the pulley 19 is mounted upon the same shaft that the fast ratchet-wheel 17 is mounted upon, it follows that the pulley will be turned to wind the brake-chain thereon. Whenever the handle 12 is released, the spring 36 acts to elevate said handle. This renders it possible for a brakeman standing upon the end of the car to actuate the brake with his foot. When it is desired to release the brakes, the handle 12 is elevated until it contacts with a stop-pin 32. This forces the parts to the position illustrated in Fig. 4. By referring to said figure it will be seen that the crank-arm 15 has been thrown to such position as to bring the tail 27 of the pawl 25 into contact with the lug 28 of the pawl 22. The first result of the movement of the parts toward the position illustrated in Fig. 4 is to lift the pawl 25 out of engagement with the ratchet-wheel until the top of said pawl contacts with the pin 29. The pawl 25 can then move no farther, and further movement of the crank-arm 15 will result in throwing the pawl 22 out of engagement with the fast ratchet-wheel. This releases the shaft 16, and the brake-chain is permitted to unwind until the lugs 30, carried by the fast ratchet-wheel, contact with the lugs 31, which are carried by the loose ratchet-wheel. In other words, this shaft is permitted to have a retrograde movement of about a quarter of a revolution at this time, which is sufficient to release the brakes. The purpose of having these ratchet-wheels arranged in this manner is to take up all slack in the brake system when the handle 12 is first actuated, but to permit only a given amount of this slack to be released when it is desired to release the brakes. By virtue of this construction it will be seen that the brakes may be more quickly applied than if a considerable amount of slack had to be wound up each time before the brakes began to come into operation. It may be desired, however, to release this slack at times for the purpose of making repairs to the brake system or putting on new brake-shoes, and to provide for this a slot 38 is formed in the lower portion of the hub of the pawl 22. (See Fig. 4.) A pin 39, which is carried by the hub of the pawl 23, projects into this slot. If the stop-pin 32 be now removed and the handle 12 thrown farther upward, the end of the slot 38, engaging the pin 39, will throw the pawl 23 out of engagement with the loose ratchet and entirely release the shaft 16, and consequently release all of the slack. The spring 36 will only throw the handle 12 upward until the tail 27 of the pawl 25 contacts with the lug 28 of the pawl 22. Further upward movement of the handle is only secured by the brakeman grasping said handle and imparting a positive upward movement thereto. After the pawls have been released, however, the tension of the spring will serve to retain the handle 12 in its elevated position against the stop-pin 32, this position of the handle indicating to the brakeman that the brakes have been released upon that particular car.

A positive upward movement by the operator must be given the handle 12 before any of the pawls, and consequently any of the brake mechanism, is released. In other words, the initial upward movement of either of the handles 12 or 12' above their normal position and until the stop-pin 32 prevents further movement thereof results in entirely releasing the fast ratchet. The loose ratchet, however, is still held by its pawl 23, and when in the retrograde movement of the fast ratchet the lugs of said fast ratchet contact with the lugs of the loose ratchet further movement of the parts is prevented. It is only after the stop-pin 32 has been removed and the actuating-handles thrown still farther upward that the shaft 16 is entirely released.

By referring to Fig. 4 it will be seen that during the initial movement of the crank-arms the throw given by the link 14 to the crank-arm 15 is an almost direct one; but as the parts move over to their extreme right-hand position in Fig. 4 the link 14 begins to come more into longitudinal alinement with the crank-arm 13, thereby producing a toggle action which enables the brakeman to apply the brakes with considerable force. It is possible by virtue of this construction for the brakeman to give the full swing to the handle 12 during the initial action of setting the brakes, thereby setting said brakes with rapidity, and at the same time it is possible to apply great force through this mechanism at the conclusion of the direct setting operation by giving short quick strokes to the actuating-handle to secure the toggle action through the parts described.

It is apparent that this invention is not limited to being placed in any particular location upon the car, for the handles 12 might be omitted and the shaft 37 lie vertically instead of horizontally, thereby rendering it possible to actuate this mechanism from the top of the car in the usual and well-known manner.

By inclosing the working parts of the mechanism in a casing they are protected from dust and grit, and it is designed to partially fill this casing with oil, which will keep the parts lubricated.

A further advantage of having the parts assembled in this manner in a casing is that these mechanisms may be put up ready for use in a factory and secured in a short time to the frame of a car.

From the foregoing description it will be seen that simple and efficient means are herein provided for accomplishing the objects of the invention; but while the elements shown and described are well adapted to serve the purposes for which they are intended it is to be understood that the invention is not limited to the precise construction set forth, but includes within its purview such changes as may be made within the scope of the appended claims.

What I claim is—

1. In a brake mechanism, the combination with a casing, of power-transmitting devices journaled in the walls of said casing, and an automatic slack-adjuster also located in said casing.

2. In a brake mechanism, the combination with a closed casing, of power-transmitting devices located in said casing, means for actuating said power-transmitting devices, an automatic slack-adjuster located in the casing, and means for releasing the slack-adjuster from the exterior of the casing.

3. In a brake mechanism, the combination with a casing, of power-transmitting devices located in said casing, means for retaining a part of the transmitting devices, and means for releasing said transmitting devices from the exterior of the casing.

4. In a brake mechanism, the combination with power-transmitting devices, of retaining devices for part of the transmitting devices, and means for the automatic return of the remainder of said transmitting devices.

5. In a brake mechanism, the combination with power-transmitting devices, of manually-operable means for actuating said power-transmitting devices from various parts of a car, a retaining device for part of the transmitting devices, and means for automatically returning part of the transmitting devices and the actuating means to their normal position.

6. In a brake mechanism, the combination with power-transmitting devices, of a retaining device for part of the transmitting devices, means for automatically returning the remainder of the power-transmitting devices to normal position, and means for releasing the parts retained.

7. In a mechanism of the character set forth, the combination with a primary power-transmitting member, of a secondary power-transmitting member, and a toggle connection between said members adapted to impart movement to said secondary power-transmitting member to set the brakes, means for releasing said secondary member for retrograde movement, and slack-adjusting mechanism for limiting the retrograde movement of said secondary member.

8. In a mechanism of the character set forth, the combination with a casing, of a primary power-transmitting member, a secondary power-transmitting member, means for actuating the primary power-transmitting member from the exterior of the casing, a toggle connection between the primary and the secondary power-transmitting members, means for releasing the secondary power-transmitting member for retrograde movement, means for limiting the retrograde movement of said secondary member, and means for releasing said limiting means.

9. In a mechanism of the character described, the combination with a casing, of a primary power-transmission member journaled in said casing, a secondary power-transmission member journaled in said casing, connections between said primary and secondary members, a manually-operable member located upon the exterior of the casing and adapted when actuated in one direction to impart movement to the secondary member to set the brakes, and adapted when moved beyond its normal position in the opposite direction to release said secondary member.

10. In a mechanism of the character described, the combination with a casing, of a primary power-transmission member journaled in said casing, a secondary power-transmission member journaled in said casing, connections between said primary and secondary members, a manually-operable member located upon the exterior of the casing and adapted when actuated in one direction to impart movement to the secondary member to set the brakes, and adapted when moved beyond its normal position in the opposite direction to release said secondary member, means for limiting the retrograde movement of the secondary member, and means controlled by said manually-operable member for releasing said limiting means.

11. In a mechanism of the character described, the combination with a primary power-transmission shaft, of a secondary power-transmission shaft, a fast ratchet-wheel secured to the secondary shaft, a loose ratchet-wheel secured to the secondary shaft, retaining-pawls for said ratchet-wheels, means for withdrawing said pawls from engagement with the ratchet-wheels, and connections between said shafts.

12. In a mechanism of the character described, the combination with a casing, of a primary power-transmission member journaled in said casing, a secondary power-transmission member journaled in said casing, connections between said members, a manually-operable member controllable from the exterior of the casing and adapted to impart movement to the primary power-transmission element, retaining devices for the secondary power-transmission member, and means controllable by the manually-operable member for withdrawing said retaining devices from engagement with said secondary member.

13. In a mechanism of the character set forth, the combination with a primary power-transmitting member, of a secondary power-transmitting member, means for actuating the primary power-transmitting member, a toggle connection between the primary and secondary power-transmitting members, means for releasing the secondary power-transmitting member for retrograde movement, means for limiting the retrograde movement of said secondary member, and means for releasing said limiting means.

14. In a brake mechanism, the combination with a shaft, of brake-operating members secured to said shaft, means for imparting movement to the shaft, and means adapted to permit a limited retrograde movement of said shaft and to hold said shaft against further retrograde movement after said limit of movement has been reached.

15. In a brake mechanism, the combination with a shaft, of a ratchet-wheel fast upon said shaft, a ratchet-wheel loosely mounted upon said shaft, members carried by said ratchet-wheels adapted to prevent a complete rotation of the loose ratchet-wheel with relation to the fast ratchet-wheel, means for imparting movement to the fast ratchet-wheel, and means for preventing retrograde movement of the loose ratchet-wheel.

16. In a brake mechanism, the combination with a shaft, of a ratchet-wheel fast upon said shaft, a ratchet-wheel loosely mounted upon said shaft, brake-actuating members secured to said shaft, members carried by said ratchet-wheels and projecting into the path of movement of each other, the members carried by the fast ratchet-wheel being adapted to impart movement to the loose ratchet-wheel by contacting with the members carried by said loose ratchet-wheel and the members of the loose ratchet-wheel being adapted to permit retrograde movement of the fast ratchet-wheel through a limited space, a pawl for preventing retrograde movement of the loose ratchet-wheel, and means for imparting movement to the fast ratchet-wheel.

17. In a brake mechanism, the combination with a shaft, of a ratchet-wheel fast upon said shaft, a ratchet-wheel loosely mounted upon said shaft, means for preventing a complete rotation of the loose ratchet-wheel with relation to the fast ratchet-wheel, means for imparting movement to the fast ratchet-wheel, means for preventing retrograde movement of the fast ratchet-wheel, and means for preventing retrograde movement of the loose ratchet-wheel.

18. In a brake mechanism, the combination with a shaft, of brake-operating members secured to said shaft, means for imparting movement to the shaft, means for releasing said shaft for retrograde movement, means for limiting the retrograde movement of said shaft, and means for releasing said limiting means.

In testimony whereof I affix my signature in presence of two witnesses.

JOHN H. McCORMICK.

Witnesses:
A. L. PHELPS,
FRANK G. CAMPBELL.